(12) United States Patent
Balsiger

(10) Patent No.: US 12,116,108 B2
(45) Date of Patent: Oct. 15, 2024

(54) AIRCRAFT CONTROL SURFACE ACTUATION MECHANISM

(71) Applicant: Hamilton Sundstrand Corporation, Charlotte, NC (US)

(72) Inventor: Derick S. Balsiger, Prescott Valley, AZ (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 71 days.

(21) Appl. No.: 17/552,899

(22) Filed: Dec. 16, 2021

(65) Prior Publication Data

US 2023/0192273 A1 Jun. 22, 2023

(51) Int. Cl.
*B64C 13/30* (2006.01)

(52) U.S. Cl.
CPC .................... *B64C 13/30* (2013.01)

(58) Field of Classification Search
CPC .... B64C 9/00; B64C 9/02; B64C 9/16; B64C 13/30
See application file for complete search history.

(56) References Cited

U.S. PATENT DOCUMENTS

| | | | | |
|---|---|---|---|---|
| 3,640,150 | A * | 2/1972 | Leiner | F16H 37/00 475/332 |
| 4,471,927 | A | 9/1984 | Rudolph et al. | |
| 4,497,461 | A * | 2/1985 | Campbell | B64C 9/00 244/99.3 |
| 5,558,299 | A * | 9/1996 | Veile | B64C 3/56 244/3.28 |
| 9,643,716 | B2 | 5/2017 | Sheahan, Jr. et al. | |
| 9,868,512 | B2 | 1/2018 | Bastiaansen et al. | |
| 2003/0127569 | A1 * | 7/2003 | Bacon | B64C 13/505 244/195 |
| 2007/0152098 | A1 * | 7/2007 | Sheahan | B64U 20/50 244/49 |
| 2013/0075537 | A1 | 3/2013 | Sakurai et al. | |

(Continued)

FOREIGN PATENT DOCUMENTS

DE 3636053 C2 2/1990

OTHER PUBLICATIONS

Extended European Search Report issued Apr. 17, 2023; EP Application No. 22211511.5-1004; 5 pages.

*Primary Examiner* — Joshua J Michener
*Assistant Examiner* — Cindi M Curry
(74) *Attorney, Agent, or Firm* — CANTOR COLBURN LLP

(57) ABSTRACT

Assemblies having a first structure, a second structure movable relative to the first structure, and an actuator system arranged therebetween and configured to control relative movement therebetween. The actuator system includes a drive shaft, a first element configured to be driven in a first direction, and a second element configured to be driven in a second direction. A spar is fixedly connected to the first structure and a spar connection pivotably connects the first element to the spar at a fixed coupler. The drive shaft, the first element, and the second element are housed within the second structure. Rotation of the second element causes a translation motion of the drive shaft away from the first structure and rotation of the first element about the fixed coupler such that the second structure is translated and rotated relative to the first structure.

20 Claims, 9 Drawing Sheets

(56) References Cited

U.S. PATENT DOCUMENTS

| | | | |
|---|---|---|---|
| 2014/0001309 A1* | 1/2014 | Tieys | B64C 3/50 |
| | | | 244/99.3 |
| 2018/0022441 A1* | 1/2018 | Huynh | B64C 13/504 |
| | | | 244/99.6 |
| 2019/0308719 A1 | 10/2019 | Huynh | |
| 2021/0114714 A1* | 4/2021 | Tsai | B64C 9/06 |
| 2022/0219808 A1* | 7/2022 | Schlipf | B64C 13/38 |

* cited by examiner

AIRCRAFT CONTROL SURFACE ACTUATION MECHANISM

BACKGROUND

Embodiments of the present disclosure are directed to actuator systems and, more specifically, to actuator systems for rotating a structure, such as aircraft control surfaces (e.g., flaps).

Wing sections of fixed wing aircraft are moving toward thin sections (e.g., cross-sectional height) and the cross sectional area of loft is making more difficult to place a geared rotary actuator at the hinge line between an aft section of the thin wing and the aircraft control surface. Conventionally, aircraft control surfaces (e.g., flaps, etc.) are controlled using an actuator within the wing portion that is operably connected to such aircraft control surface. Drop hinges are typically used, but with thin wing configurations, such drop hinges have detrimental impact on drag and can offset the benefits of thin wing configurations. Accordingly, improved actuators for aircraft control surfaces may be desirable to improve flight efficiencies associated with thin wing craft.

BRIEF DESCRIPTION

According to some embodiments, actuator assemblies are provided. The assemblies include a first structure, a second structure configured to be moved relative to the first structure, and an actuator system arranged between the first structure and the second structure and configured to control relative movement between the first structure and the second structure. The actuator system includes a drive shaft, a first rotary actuator element operably coupled to the drive shaft and configured to be driven in a first direction about the drive shaft, a second rotary actuator element positioned adjacent the first rotary actuator element and operably coupled to the drive shaft and configured to be driven in a second direction about the drive shaft, the second direction being a counter-rotation relative to the first direction, a spar fixedly connected to the first structure, and a spar connection configured to pivotably connect the first rotary actuator element to the spar at a fixed coupler. The drive shaft, the first rotary actuator element, and the second rotary actuator element are housed within the second structure and rotation of the second rotary actuator element causes a translation motion of the drive shaft away from the first structure and rotation of the first rotary actuator element about the fixed coupler such that the second structure is translated and rotated relative to the first structure.

In addition to one or more of the features described herein, or as an alternative, further embodiments of the assemblies may include that the first structure is a wing and the second structure is an aircraft flight control element.

In addition to one or more of the features described herein, or as an alternative, further embodiments of the assemblies may include that the aircraft flight control element is a flap attached to the wing by the actuator system.

In addition to one or more of the features described herein, or as an alternative, further embodiments of the assemblies may include a motor operably coupled to the drive shaft to drive rotation of the drive shaft.

In addition to one or more of the features described herein, or as an alternative, further embodiments of the assemblies may include an actuator controller operably coupled to the motor to control operation of the motor.

In addition to one or more of the features described herein, or as an alternative, further embodiments of the assemblies may include that each of the first rotary actuator element and the second rotary actuator element are compound gear rotary actuators.

In addition to one or more of the features described herein, or as an alternative, further embodiments of the assemblies may include that the second rotary actuator element comprises a linkage extension. The actuator system further includes a spar link pivotably connected to the linkage extension by a first pivot pin and the spar link is connected to the spar by a second pivot pin.

In addition to one or more of the features described herein, or as an alternative, further embodiments of the assemblies may include that the spar includes a pin, wherein the drive shaft is moveable from a first position to a second position by operation of the first and second rotary actuator elements.

In addition to one or more of the features described herein, or as an alternative, further embodiments of the assemblies may include that in the first position the drive shaft is separated from the pin of the spar by a first vertical distance and a first horizontal distance, and in the second position the drive shaft is separated from the pin of the spar by a second vertical distance and a second horizontal distance, wherein the first vertical distance is less than the second vertical distance and the first horizontal distance is greater than the second horizontal distance.

In addition to one or more of the features described herein, or as an alternative, further embodiments of the assemblies may include that in the second position an air gap is formed between the first structure and the second structure.

According to some embodiments, aircraft are provided. The aircraft include a wing, an aircraft flight control element attached to the wing, and an actuator system arranged between the wing and the aircraft flight control element and configured to control relative movement of the aircraft flight control element relative to the wing. The actuator system includes a drive shaft, a first rotary actuator element operably coupled to the drive shaft and configured to be driven in a first direction about the drive shaft, a second rotary actuator element positioned adjacent the first rotary actuator element and operably coupled to the drive shaft and configured to be driven in a second direction about the drive shaft, the second direction being a counter-rotation relative to the first direction, a spar fixedly connected to the wing, and a spar connection configured to pivotably connect the first rotary actuator element to the spar at a fixed coupler. The drive shaft, the first rotary actuator element, and the second rotary actuator element are housed within the aircraft flight control element and wherein rotation of the second rotary actuator element causes a translation motion of the drive shaft away from the wing and rotation of the first rotary actuator element about the fixed coupler such that the aircraft flight control element is translated and rotated relative to the wing.

In addition to one or more of the features described herein, or as an alternative, further embodiments of the aircraft may include that the actuator system comprises at least one additional first rotary actuator element and at least one additional second rotary actuator element coupled to the drive shaft and configured to control movement of the aircraft flight control element, wherein the at least one additional first and second rotary actuator elements are housed within the aircraft flight control element.

In addition to one or more of the features described herein, or as an alternative, further embodiments of the aircraft may include that the aircraft flight control element is a flap attached to the wing by the actuator system.

In addition to one or more of the features described herein, or as an alternative, further embodiments of the aircraft may include a motor operably coupled to the drive shaft to drive rotation of the drive shaft.

In addition to one or more of the features described herein, or as an alternative, further embodiments of the aircraft may include an actuator controller operably coupled to the motor to control operation of the motor.

In addition to one or more of the features described herein, or as an alternative, further embodiments of the aircraft may include that each of the first rotary actuator element and the second rotary actuator element are compound gear rotary actuators.

In addition to one or more of the features described herein, or as an alternative, further embodiments of the aircraft may include that the second rotary actuator element comprises a linkage extension. The actuator system further includes a spar link pivotably connected to the linkage extension by a first pivot pin and the spar link is connected to the spar by a second pivot pin.

In addition to one or more of the features described herein, or as an alternative, further embodiments of the aircraft may include that the spar includes a pin, wherein the drive shaft is moveable from a first position to a second position by operation of the first and second rotary actuator elements.

In addition to one or more of the features described herein, or as an alternative, further embodiments of the aircraft may include that in the first position the drive shaft is separated from the pin of the spar by a first vertical distance and a first horizontal distance, and in the second position the drive shaft is separated from the pin of the spar by a second vertical distance and a second horizontal distance, wherein the first vertical distance is less than the second vertical distance and the first horizontal distance is greater than the second horizontal distance.

In addition to one or more of the features described herein, or as an alternative, further embodiments of the aircraft may include that in the second position an air gap is formed between the wing and the aircraft flight control element.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
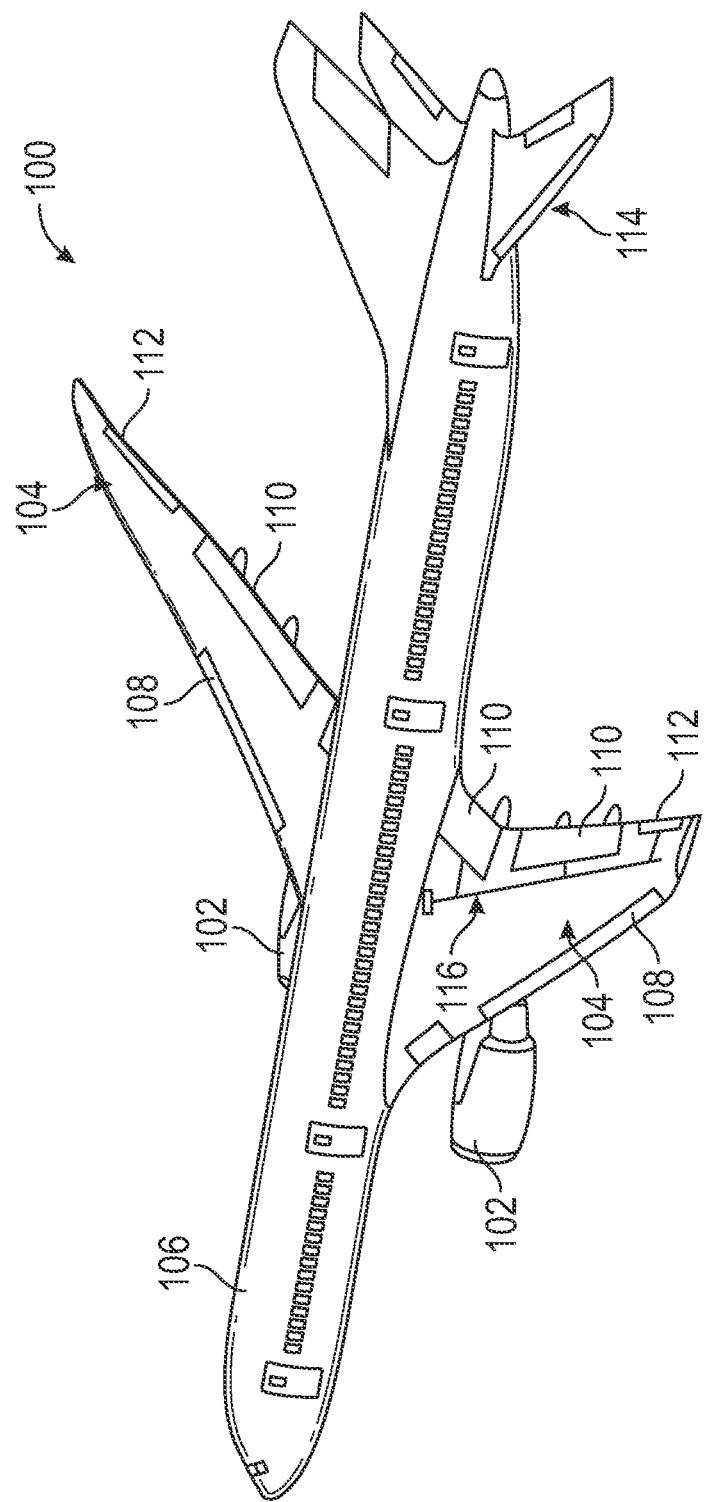
FIG. 1 is a schematic illustration of an aircraft that can include aircraft flight control elements and associated flight control actuator systems in accordance with embodiments of the present disclosure.

FIG. 1 illustrates an example of an aircraft 100 having aircraft engines surrounded by (or otherwise carried in) nacelles 102. The aircraft 100 includes wings 104 that extend from an aircraft fuselage 106. Each wing 104 may include one or more slats 108 on a forward edge or leading edge and one or more flaps 110 on an aft, rear, or trailing edge thereof. The wings 104 may also include ailerons 112 on the trailing edges, as will be appreciated by those of skill in the art. The aircraft 100, as shown, includes a tail structure 114 which can include various flaps, ailerons, slats, and the like, as will be appreciated by those of skill in the art. The flaps, slats, ailerons, and the like are generally referred to herein as "aircraft flight control elements" as they are movable under aircraft power systems and are configured to control flight and motion of the aircraft 100. A flight control actuator system 116 may be connected to one or more of the aircraft flight control surfaces. For example, each wing 104 and the tail structure may include one or more flight control actuator systems 116. The flight control actuator systems 116 may be operably connected to the various aircraft flight control elements and configured control the operation/position of the aircraft control surfaces to control flight of the aircraft 100.

In order to reduce weight and increase flight efficiencies, aircraft are being designed with relatively thin wings (in a cross-sectional direction between pressure and suction sides). Conventionally, the actuators that connect to and control operation of the aircraft flight control elements are housed within the wing itself. However, with the reduced cross-sectional area of the wing (e.g., interior space) there is less room to install such actuators. For example, it has become more difficult to install a geared rotary actuator at a hinge line or aft spar of the wing due to space constraints. In view of this, embodiments of the present disclosure are directed to flight control actuator systems installed within or as part of the aircraft flight control element, with only a minimal connection or minimal components arranged within the aft portion of the wing. By installing the flight control actuator systems within the aircraft flight control element (e.g., flap, slat, aileron, etc.), volume in the wing area is made available for other components or purposes. For example, by moving the actuator system primarily into the aircraft flight control element, the wing may have more volume to contain fuel. In accordance with some embodiments, the flight control actuator systems may include a mechanism for transferring rotary motion into translational and rotary motion to produce an air gap slot and angle or move the aircraft flight control element. The operational components of such systems may be housed within the aircraft flight control elements.

Figure 2:
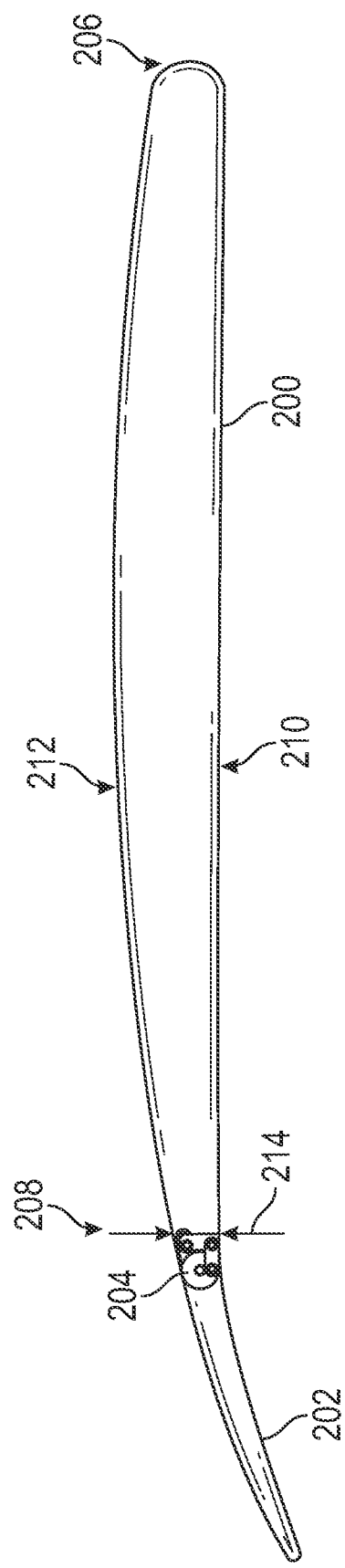
FIG. 2 is a schematic illustration of a wing, aircraft flight control element, and flight control actuator system in accordance with an embodiment of the present disclosure.

For example, referring now to FIG. 2, a schematic illustration of a wing 200 having an aircraft flight control element 202 installed at an aft end thereof is shown. In this embodiment, the aircraft flight control element 202 is a flap that is moveable (e.g., rotatable or pivotable) relative to the wing 200 to control an airflow across the wing 200 to aid in flight control (e.g., lift). The aircraft flight control element 202 is operably connected to the wing by a flight control actuator system 204. The wing 200 is shown in cross-section, having a leading edge 206, a trailing edge 208, a pressure side surface 210, and a suction side surface 212. The flight control actuator system 204 is arranged to couple the aircraft flight control element 202 to the wing 200 at the trailing edge 208 thereof.

At the trailing edge 208 of the wing 200, the wing 200 has a cross-sectional thickness 214. With conventional or prior wing configurations, the cross-sectional thickness 214 of the wing may be 8-10 inches. This cross-sectional thickness of the conventional wings provided sufficient space (volume) for installation of components such as a flight control actuator system. However, in accordance with some embodiments of the present disclosure, thin wing configurations are employed, where the wing 200 may have a cross-sectional thickness 214 at the trailing edge 208 of 5 inches or less. This reduction in cross-sectional thickness as compared to conventional wings has required adjustment of the flight control actuator systems. For example, rather than having the primary components of the flight control actuator system 204 installed within the wing 200, in accordance with embodiments of the present disclosure, the flight control actuator system 204 is primarily installed within and part of the aircraft flight control element 202. In some embodiments, the flight control actuator system 204 may include one or more linkages that connect to an aft spar of the wing 200, and the operational components (e.g., drive shaft, motor, geared actuator, etc.) may be housed within the aircraft flight control element 202. It is noted that although thin wings are described herein for implementation of embodiments of the present disclosure, it will be appreciated that the flight control actuator systems described herein may be employed with conventional (e.g., thick) wings, doors, or other surfaces and/or systems that require rotation or pivoting of one component relative to another. As such, the present disclosure is not intended to be limited to thin wing applications, but rather such description is provided merely for informative purposes.

Figure 3:
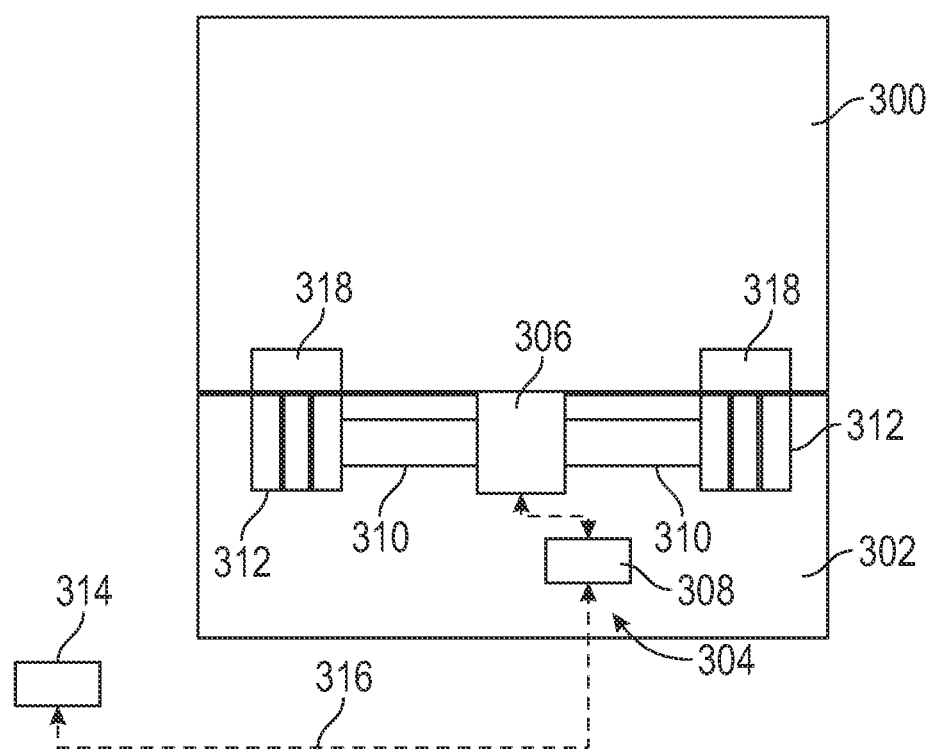
FIG. 3 is a schematic illustration of a wing, aircraft flight control element, and flight control actuator system in accordance with an embodiment of the present disclosure.

Turning now to FIG. 3, a schematic illustration of a wing 300 having an aircraft flight control element 302 installed at an aft end thereof is shown. In this embodiment, the aircraft flight control element 302 is a flap that is moveable (e.g., rotatable or pivotable) relative to the wing 300 to control an airflow across the wing 300 to aid in flight control (e.g., lift). The aircraft flight control element 302 is operably connected to the wing by a flight control actuator system 304.

The flight control actuator system 304 is primarily installed and housed within the aircraft flight control element 302. In this embodiment, the flight control actuator system 304 includes a motor 306, an actuator controller 308, a drive shaft 310, and a plurality of actuators 312. The actuator controller 308 is an electronic or electrical component configured to control operation of the motor 306, such as in response to commands received from a command system 314 that may be controlled by a pilot, operator, or autonomous system that controls operation of an aircraft to which the wing 300 is part of. The command system 314 is configured send and receive electrical signals to/from the actuator controller 308 through command connection 316 (e.g., wired, or wireless). The motor 306 is configured to rotationally drive the drive shaft 310. As the drive shaft 310 is rotated by the motor 306, the actuators 312 will be actuated or otherwise operated to cause movement (e.g., rotation, pivot, translation, etc.) of the aircraft flight control element 302.

Each actuator 312 is arranged and housed within the aircraft flight control element 302 and is connected to the wing 300 by one or more respective wing spars 318. The wing spars 318 are structural elements arranged at an aft end or side of the wing 300 and provide structural connection between the wing 300 and the aircraft flight control element 302. As such, the only portion of the flight control actuator system 304 that is housed within the wing 300 is the connection to the wing spars 318 at the actuators 312, and the remainder of the components of the flight control actuator system 304 are housed within the aircraft flight control element 302 (e.g., actuator controller 308, motor 306, drive shaft 310, and actuators 312).

Figure 4A:
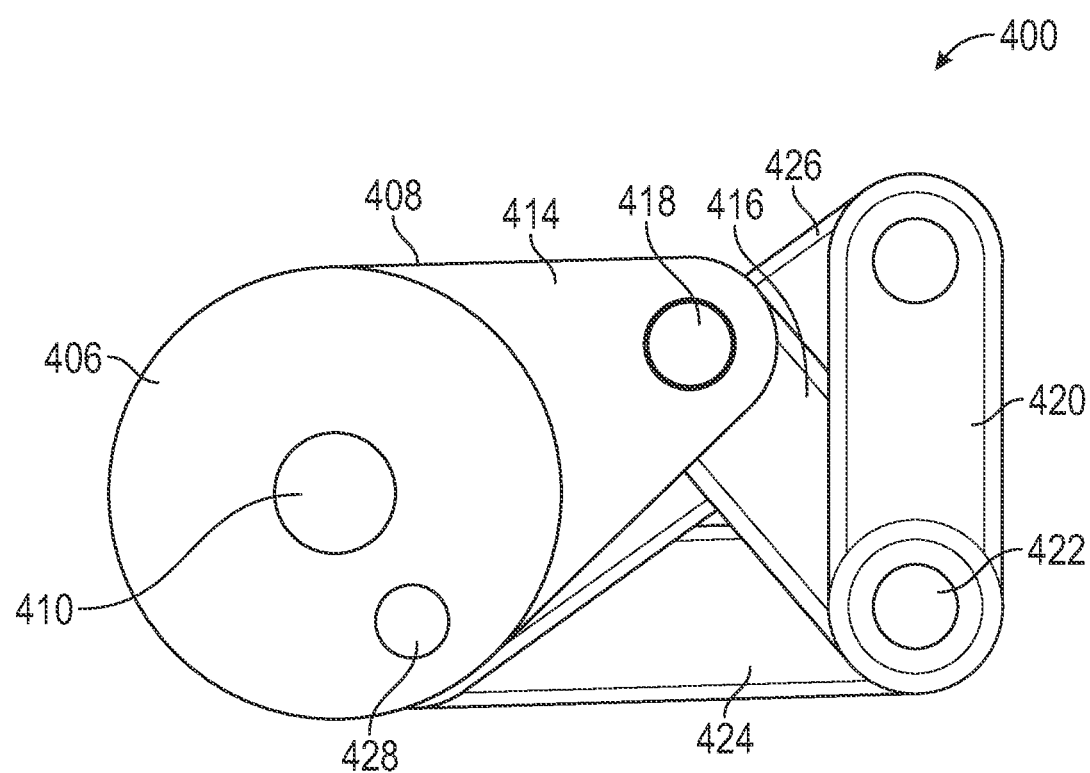
FIG. 4A is a schematic illustration of a flight control actuator system in accordance with an embodiment of the present disclosure.
Figure 4B:
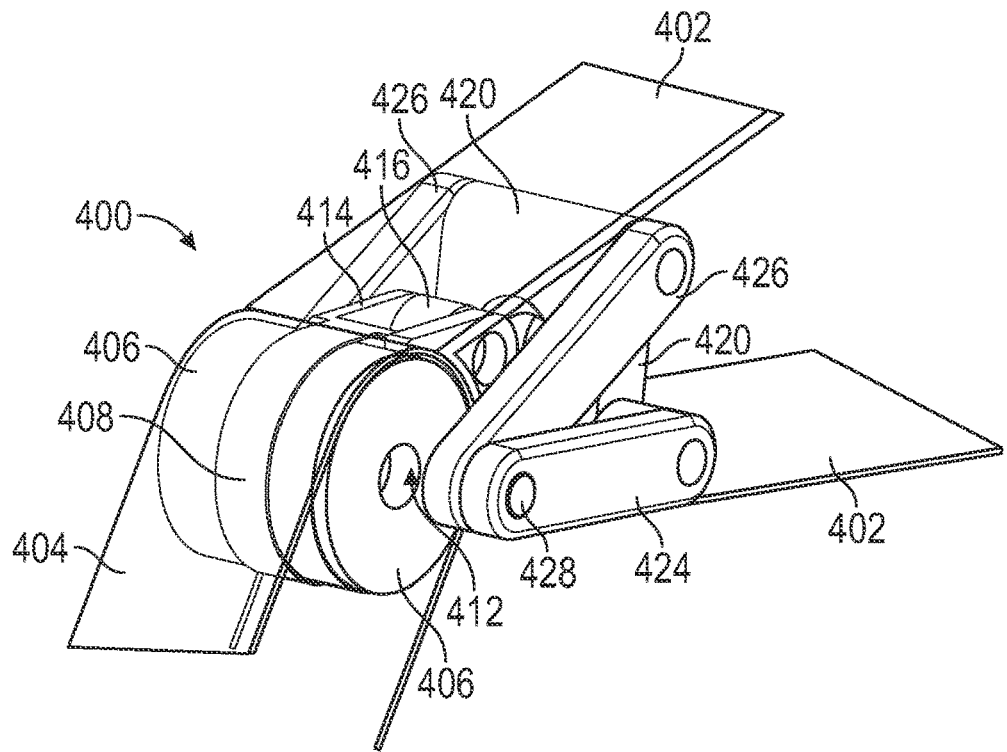
FIG. 4B is a schematic illustration of the flight control actuator system of FIG. 4A in a first position between a wing and aircraft flight control element.
Figure 4C:
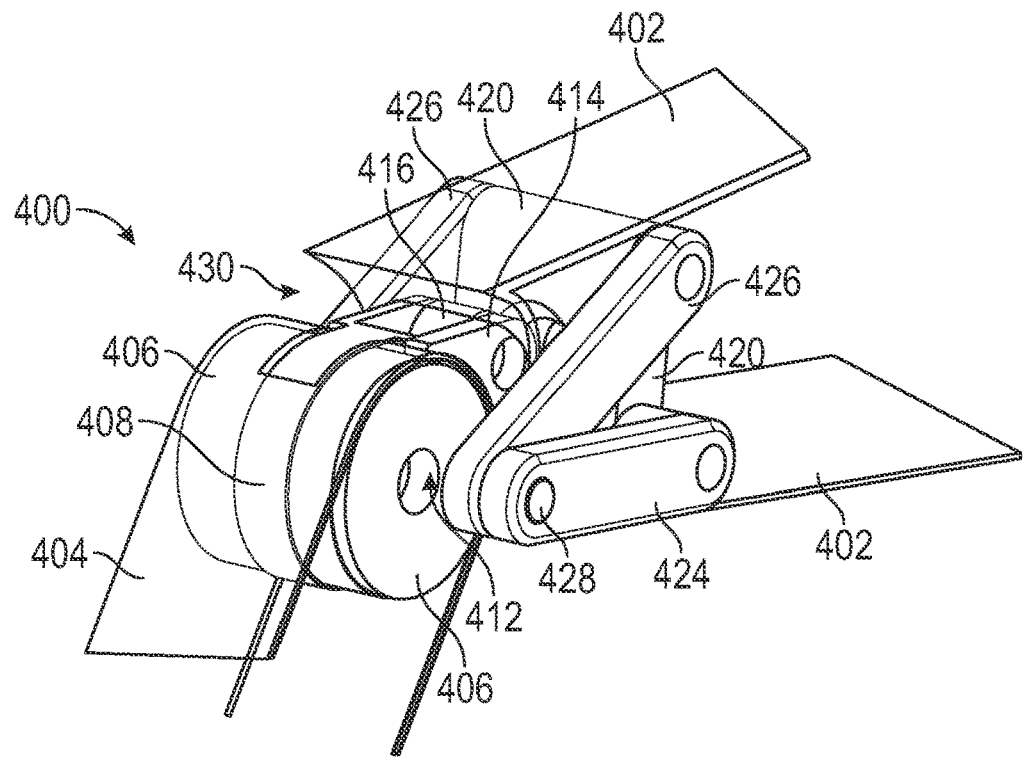
FIG. 4C is a schematic illustration of the flight control actuator system of FIG. 4A in a second position between a wing and aircraft flight control element.

Turning now to FIGS. 4A-4C, schematic illustrations of a flight control actuator system 400 in accordance with an embodiment of the present disclosure are shown. FIG. 4A illustrates a side elevation view of the flight control actuator system 400 (without wing or aircraft flight control element shown), FIG. 4B illustrates the flight control actuator system 400 as mounted to a wing 402 and supporting and controlling movement of an aircraft flight control element 404 in a first position, and FIG. 4C illustrates the flight control actuator system 400 in a second position. The flight control actuator system 400 may be part of a fixed-wing aircraft (e.g., airplane), as shown, but may be employed to allow relative movement between any two structures (e.g., to replace a hinge in a door or hatchway).

Referring to FIGS. 4A-4C, the flight control actuator system 400 includes a first rotary actuator element 406, a second rotary actuator element 408, and a drive shaft 410. The drive shaft 410 may be operably coupled to a motor (e.g., motor 306 shown in FIG. 3) and may be rotationally driven by the motor. The drive shaft 410 passes through apertures 412 of the first and second rotary actuator elements 406, 408. FIG. 4A illustrates the drive shaft 410 and FIGS. 4B-4C illustrates the apertures 412 without the drive shaft 410 passing therethrough, for clarity of illustration. Each of the first and second rotary actuator elements 406, 408 are operably coupled to the drive shaft 406 such that rotation of the drive shaft 410 causes rotation of the respective first and second rotary actuator elements 406, 408. In accordance with embodiments of the present disclosure, the first rotary actuator element 406 is configured to be rotationally driving in a direction opposite to the second rotary actuator element 408. Such counter rotation may be achieved, for example, by using a compound gear or compound gearing or threaded drive shaft that interacts with threading on each of the first and second rotary actuator elements. It will be appreciated that other connection configurations may be employed without departing from the scope of the present disclosure. For example, in some embodiments, a geared connection or compound geared connection may be employed. In some embodiments, the first and second rotary actuator elements 406, 408 may be compound gear rotary actuators.

In this illustrative configuration, the flight control actuator system 400 includes two first rotary actuator elements 406 with a single second rotary actuator element 408 arranged between the two first rotary actuator elements 406. Each of the two first rotary actuator elements 406 are substantially cylindrical in shape and the second rotary actuator element 408 is substantially cylindrical in shape and includes a linkage extension 414. The linkage extension 414 of the second rotary actuator element 408 is configured to pivotably connect to a spar link 416 at a first pivot pin 418. The first pivot pin 418 is coupled to the spar link 416 at a first end of the spar link 416 and the spar link 416 is coupled to a wing spar 420 at a second end thereof by a second pivot pin 422. The wing spar 420 is a structural part of the wing 402 (e.g., at an aft or trailing end of the wing 402). The spar link 416 is moveable relative to both the first pivot pin 418 at the first end thereof and the second pivot pin 422 at the second end thereof (opposite the first end). In other configurations of the present disclosure, the wing spar 420 may be attached to a rear spar of the wing.

The first rotary actuator elements 406 are movably coupled to the wing spar 420 by a first spar connection 424 and a second spar connection 426. FIG. 4A illustrates the flight control actuator system 400 without one set of the spar connections 424, 426 for clarity purposes. The first and second spar connections 424, 426 are fixed connections that do not move. As such, in some embodiments, the first and second spar connections 424, 426 and the wing spar 420 may be formed as a single, integral, or unitary structure, and such separate element configuration as shown is not to be limiting. As shown, the first and second spar connections 424, 426 couple to the first rotary actuator elements at a fixed coupler 428. The fixed coupler 428 defines a point about which the first rotary actuator elements 406 may rotate, causing a rotation and translation of the aircraft flight control element 404 (illustratively shown between a first position in FIG. 4B and a second position in FIG. 4C).

When the aircraft flight control element 404 is transitioned from the first position (FIG. 4B) to the second position (FIG. 4C) the aircraft flight control element 404 may be positioned to increase lift or provide other flight control. Further, when the aircraft flight control element 404 is in the second position (FIG. 4C) an air gap 430 is formed between the aft end of the wing 402 and the aircraft flight control element 404. This air gap 430 permits airflow therethrough when the aircraft flight control element 404 is in the second position.

In operation, when the drive shaft 410 is rotationally driven by a motor, the drive shaft 410 will cause the first rotary actuator elements 406 and the second rotary actuator element 408 to counter-rotate relative to each other. As the rotary actuator elements 406, 408 counter-rotate, the first rotary actuator elements 408 will rotate about the fixed coupler 428 causing the entire assembly (rotary actuator elements 406, 408 and drive shaft 410) to move (e.g., from the first position toward the second position). During this movement, the linkage extension 414 and the spar link 416 will pivot relative to each other about the first pivot pin 418 providing an extension or translation motion to extend the aircraft flight control element 404 outward and away from the wing 402.

Figure 5:
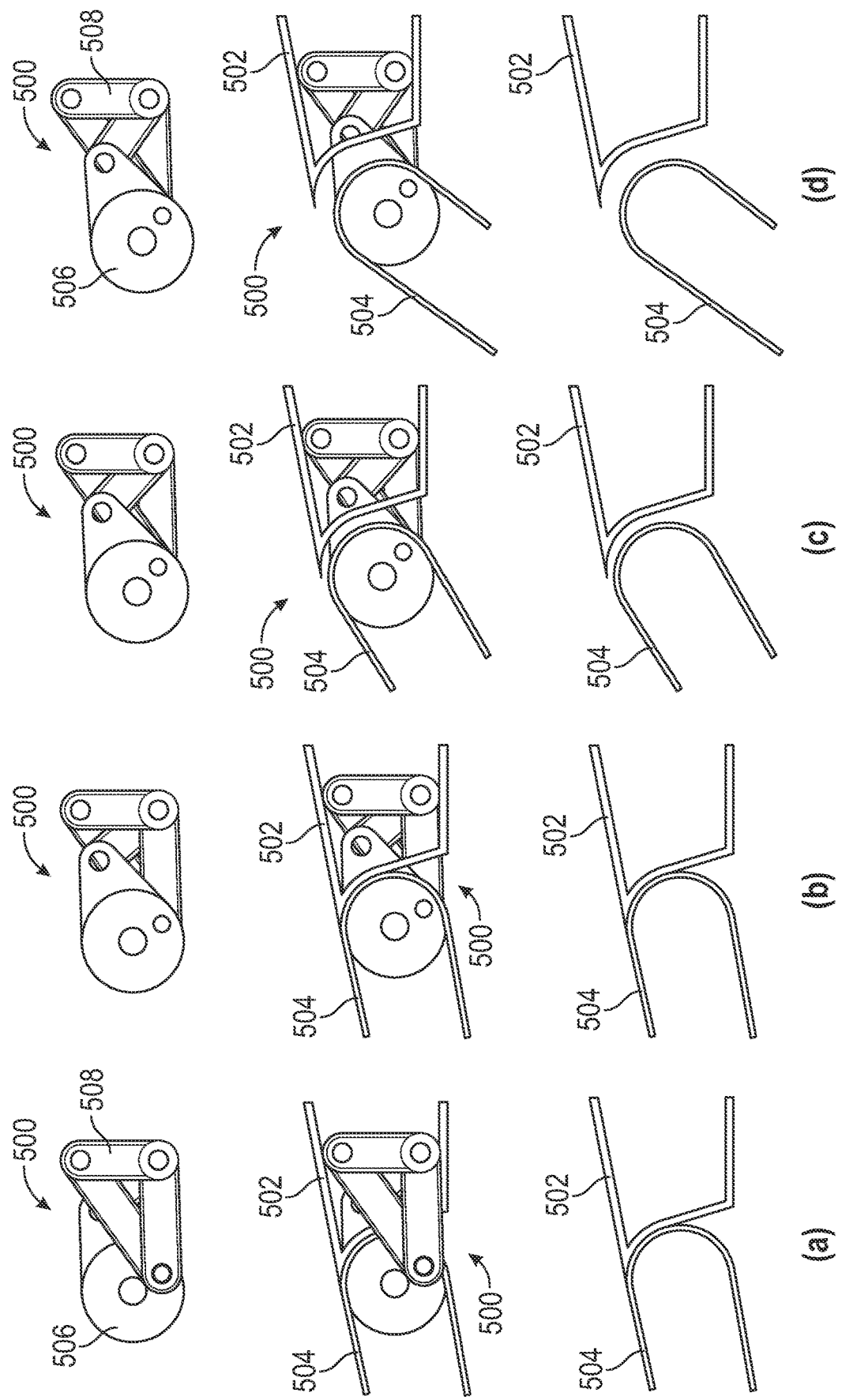
FIG. 5 is a grid of schematic depictions of operation of a flight control actuator system in accordance with an embodiment of the present disclosure.

Turning now to FIG. 5, schematic illustrations of a flight control actuator system 500 operably coupled between a wing 502 and an aircraft flight control element 504 are shown. FIG. 5 is separated into a sequential series of images in matrix form representing operation of the components of a system in accordance with an embodiment of the present disclosure. The grid of FIG. 5 includes three rows: first row (i), second row (ii), and third row (ii); and four columns: first column (a), second column (b), third column (c), and fourth column (d). The first row (i) illustrates the operation of the flight control actuator system 500 in isolation, the second row (ii) illustrates the operation of the flight control actuator system 500 with the wing 502 and aircraft flight control element 504 shown, and the third row (iii) illustrates the relative movement of the aircraft flight control element 504 relative to the wing 502 with the flight control actuator system 500 illustratively removed. First column (a) illustrates a side view of the flight control actuator system 500, the wing 502, and the aircraft flight control element 504 in a first position and the second column (b) is the same illustration but with certain features omitted for clarity. The fourth column (d) illustrates a side view of the flight control actuator system 500, the wing 502, and the aircraft flight control element 504 in a second position. The third column (c) illustrates a side view of the flight control actuator system 500, the wing 502, and the aircraft flight control element 504 in a transition state between the first position and the second position.

The flight control actuator system 500 may be substantially similar to that shown and described above with respect to FIGS. 4A-4C. The flight control actuator system 500 includes at least two rotary actuator elements 506 that are configured to counter-rotate relative to each other in response to a rotation of a drive shaft. A first rotary actuator element is attached to a wing spar 508 at a fixed coupler that defines a rotational or pivot point, as described above. A second rotary actuator element, configured to counter-rotate relative to the first rotary actuator element, is connected to the wing spar through a linkage extension and a spar link that are joined by a first pivot pin. This configuration enables a rotation and translational movement of the aircraft flight control element 504 relative to the wing 502 during actuation of the flight control actuator system 500. As shown in FIG. 5, as the rotary actuator elements are rotated (from the first position to the second position), the rotary actuator elements 506 will translate away and downward relative to the wing spar 508.

Figure 6A:
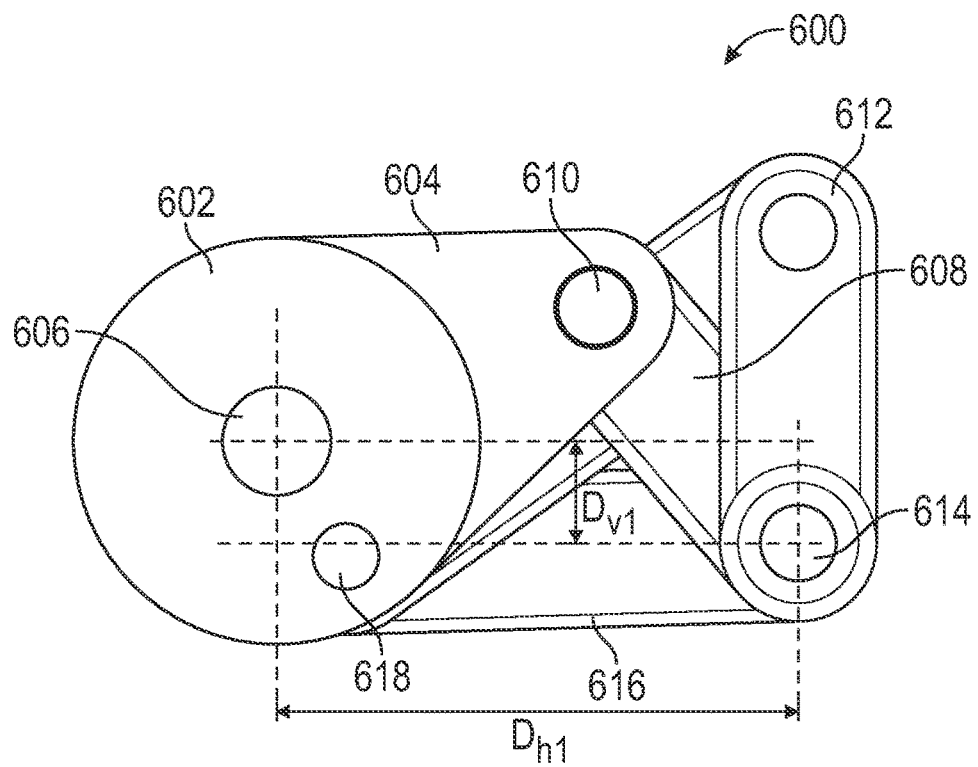
FIG. 6A is a schematic illustration of a flight control actuator system in accordance with an embodiment of the present disclosure shown in a first position.
Figure 6B:
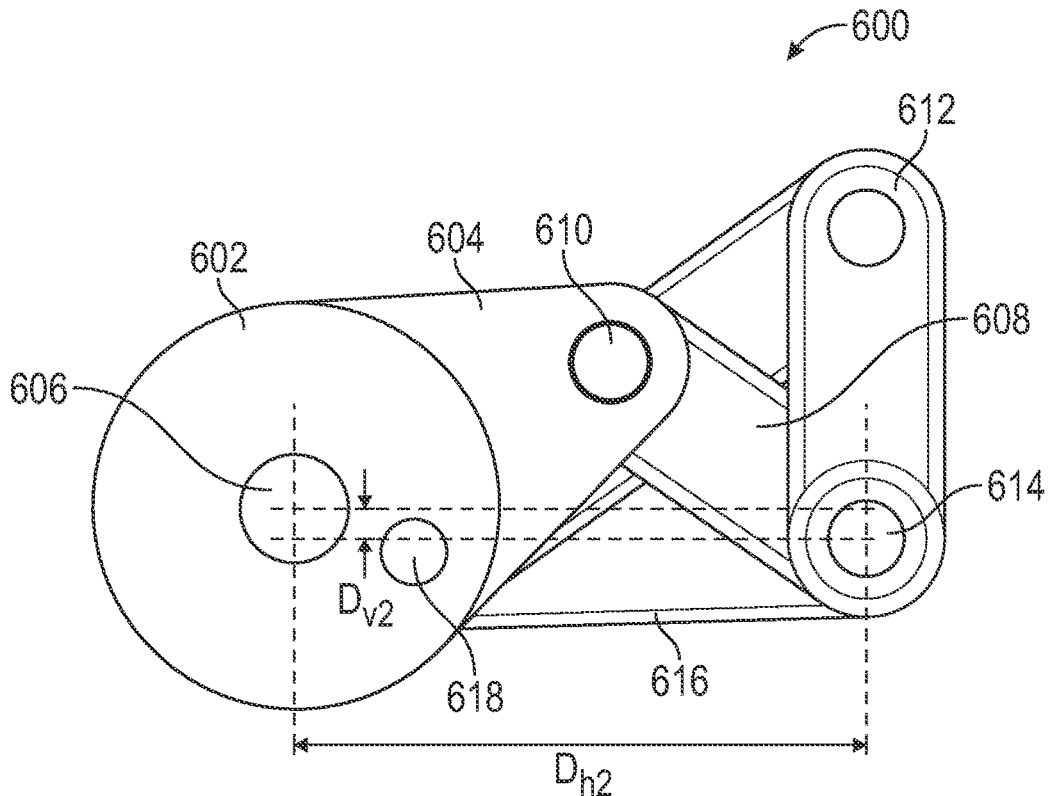
FIG. 6B is a schematic illustration of the flight control actuator system of FIG. 6A shown in a second position.

The movement provided actuation of a flight control actuator system 600 is illustratively shown in FIGS. 6A-6B. FIG. 6A illustrates the flight control actuator system 600 in a first position and FIG. 6B illustrates the fight control actuator system 600 in a second position. The flight control actuator system 600 is similar in construction as that shown and described above with respect to FIGS. 4A-4C. The flight control actuator system 600 includes a first rotary actuator element 602 and a second rotary actuator element 604. The rotary actuator elements 602, 604 are each operably coupled to a drive shaft 606. Rotation of the drive shaft 606 causes counter-rotation of the rotary actuator elements 602, 604, which causes actuation or movement of the flight control actuator system 600. The second rotary actuator element 604 is coupled to a spar link 608 by a first pivot pin 610. The spar link 608 is pivotably coupled to a wing spar 612 by a second pivot pin 614. The first rotary actuator element 602 is rotatably coupled to the wing spar 612 by at least one spar connection 616 at a respective fixed coupler 618.

FIGS. 6A-6B are illustratively shown with the second pivot pin 614 aligned between the two schematics such that the relative movement of components of the flight control actuator system 600 may be shown. The wing spar 612, the second pivot pin 614, the spar connection 616, and the fixed coupler 618 do not change position between the first position (FIG. 6A) and the second position (FIG. 6B) of the flight control actuator system 600.

In the first position (FIG. 6A), the drive shaft 606, representative of the movement imparted to an aircraft flight control element, has a first vertical separation distance $D_{v1}$ from the second pivot pin 614. In the second position (FIG. 6B), the drive shaft 606 has a second vertical separation distance $D_{v2}$ from the second pivot pin 614. As illustrated, the first vertical separation distance $D_{v1}$ is greater than the second vertical separation distance $D_{v2}$. This decrease in the vertical separation distance illustrates the movement of an aircraft flight control element moving downward.

Similarly, in the first position (FIG. 6A), the drive shaft 606, representative of the movement imparted to an aircraft flight control element, has a first horizontal separation distance $Dh_1$ from the second pivot pin 614. In the second position (FIG. 6B), the drive shaft 606 has a second horizontal separation distance $D_{h2}$ from the second pivot pin 614. As illustrated, the first horizontal separation distance $D_{h1}$ is less than the second horizontal separation distance $D_{h2}$. This increase in the horizontal separation distance illustrates the movement of an aircraft flight control element moving downward.

Because of the fixed connection at the fixed coupler 618, when the two translational movement occur (vertical and horizontal), the drive shaft 606 and rotary actuator elements 602, 608 and the attached aircraft flight control element will translate and rotate. Such translation and rotation will position the attached aircraft flight control element in a desired position (e.g., second position) where an air gap is formed, and the attached aircraft flight control element may be positioned to generate more lift to an aircraft. As described above, and in accordance with embodiments of the present disclosure, the drive shaft 606 and rotary actuator elements 602, 608 may be housed within the aircraft flight control element, with only the wing spar 612 and spar connection 616 being part of the wing of the aircraft.

Figure 7A:
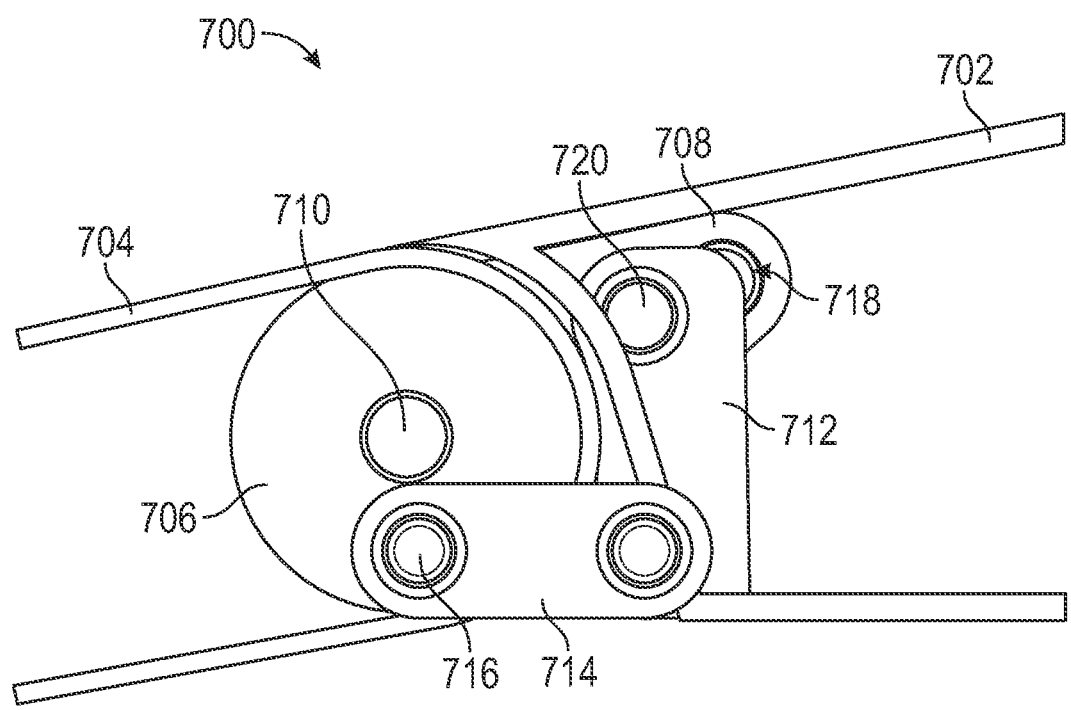
FIG. 7A is a schematic illustration of a flight control actuator system in accordance with an embodiment of the present disclosure.
Figure 7B:
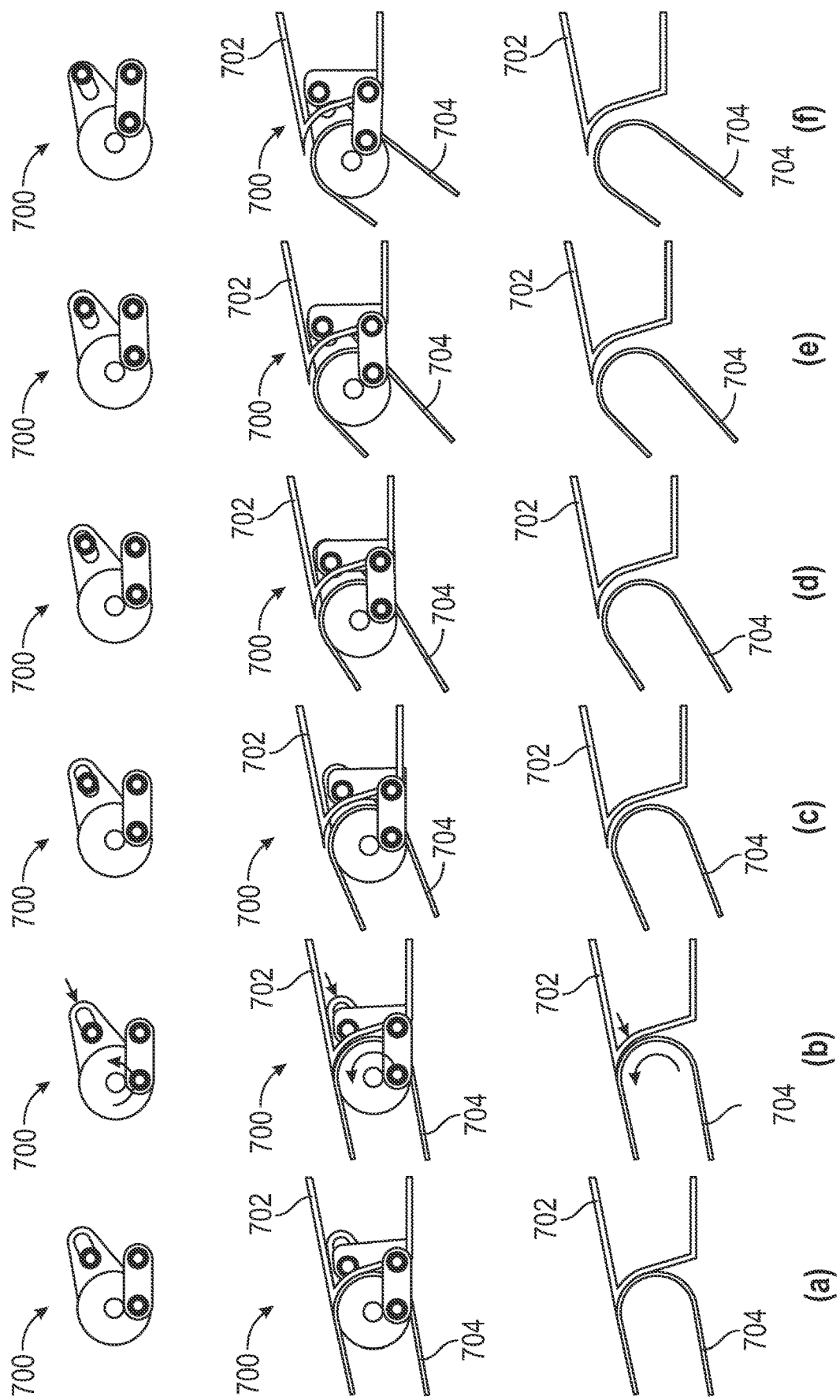
FIG. 7B is a grid of schematic depictions of operation of the flight control actuator system of FIG. 7A.

Turning now to FIGS. 7A-7B, schematic illustrations of a flight control actuator system 700 in accordance with an embodiment of the present disclosure are shown. FIG. 7A illustrates a side elevation view of the flight control actuator system 700 coupled between a wing 702 and an aircraft flight control element 704 and FIG. 7B illustrates the flight control actuator system 700, wing 702, and aircraft flight control element 704 in a series of illustrations showing a transition from a first position (column (a)) to a second position (column (0).

The flight control actuator system 700 includes a first rotary actuator element 706, a second rotary actuator element 708, and a drive shaft 710 about which the two rotary actuator elements 706, 708 may counter-rotate, as described above. In this configuration, as in the above described embodiments, the first rotary actuator element 706, the second rotary actuator element 708, and the drive shaft 710 are housed within the aircraft flight control element 704. The wing 702 includes a wing spar 712 that is positioned in fixed relation to the wing 702. In this embodiment, a spar connection 714 connects the first rotary actuator element 706 to the wing spar 712 to permit rotation and translation similar to that described above, with the pivot point of the first rotary actuator element 706 being at a fixed coupler 716. In this embodiment, the second rotary actuator element 708 includes a slot 718 which enables the second rotary actuator element 708 to translate relative to a spar pin 720. As the rotary actuator elements 706, 708 rotate relative to each other, as driven by the drive shaft 710, the second rotary actuator element 708 will translate, and the first rotary actuator element 706 will pivot about the fixed coupler 716, thus causing the aircraft flight control element 704 to translate and rotate or pivot.

This rotation and translation of the aircraft flight control element 704 is schematically shown in grid form in FIG. 7B (e.g., similar to that shown in FIG. 5). The grid of FIG. 7B includes three rows: first row (i), second row (ii), and third row (ii); and six columns: first column (a), second column (b), third column (c), fourth column (d), fifth column (d), and sixth column (e). The first row (i) illustrates the operation of the flight control actuator system 700 in isolation, the second row (ii) illustrates the operation of the flight control actuator system 700 with the wing 702 and aircraft flight control element 704 shown, and the third row (iii) illustrates the relative movement of the aircraft flight control element 704 relative to the wing 702 with the flight control actuator system 700 illustratively removed. First column (a) illustrates a side view of the flight control actuator system 700, the wing 702, and the aircraft flight control element 704 in a first position. Second column (b) illustrates schematic directions arrows indicating the translation and rotation of the various components, still in the first position. The third (c), forth (d), and fifth (e) columns illustrate the movement or transition from the first position (first column (a)) to the second position (sixth column (f)) of the flight control actuator system 700, the wing 702, and the aircraft flight control element 704. The sixth column (0 illustrates a side view of the flight control actuator system 700, the wing 702, and the aircraft flight control element 704 in the second position.

Advantageously, embodiments of the present disclosure provide for improved aerodynamics for thin wing aircraft configurations. In accordance with some embodiments, various components of a flight control actuator system installed and housed within an aircraft flight control element. This differs from prior configurations that housed the same components within the wing of the aircraft. By moving such components into the aircraft flight control element, drop hinges may be eliminated for operation of the aircraft flight control elements. Advantageously, this can improve the aerodynamics of the aircraft (e.g., reduction in drag). Additionally, weight savings may be realized by embodiments of the present disclosure by eliminated complex hinging mechanisms. Furthermore, by moving various components of the flight control actuator systems into the aircraft flight control element, space savings may be realized within the wing, enabling a lighter wing and/or ability to provide other functionality to the wing (e.g., increased fuel storage capacity).

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein. It should be appreciated that relative positional terms such as "forward," "aft," "upper," "lower," "above," "below," and the like are with reference to normal operational attitude and should not be considered otherwise limiting.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed as:

1. An assembly comprising:
    a first structure having a trailing edge with a cross-sectional thickness at the trailing edge being 5 inches or less;
    a second structure movably attached to the first structure and configured to be moved relative to the first structure, wherein the second structure is an aircraft flight control element; and
    an actuator system arranged between the first structure and the second structure and configured to control relative movement between the first structure and the second structure, wherein the actuator system comprises:
        a drive shaft;
        a first rotary actuator element operably coupled to the drive shaft and configured to be driven in a first direction about the drive shaft;
        a second rotary actuator element positioned adjacent the first rotary actuator element and operably coupled to the drive shaft and configured to be driven in a second direction about the drive shaft, the second direction being a counter-rotation relative to the first direction;
        a spar fixedly connected to the first structure; and
        a spar connection configured to pivotably connect the first rotary actuator element to the spar at a fixed coupler;
        wherein the drive shaft, the first rotary actuator element, and the second rotary actuator element are housed within the second structure, and
        wherein rotation of the second rotary actuator element causes a translation motion of the drive shaft away from the first structure and rotation of the first rotary actuator element about the fixed coupler such that the second structure is translated and rotated relative to the first structure.

2. The assembly of claim 1, wherein the first structure is an aircraft wing and the second structure is an aircraft flight control element.

3. The assembly of claim 2, wherein the aircraft flight control element is a flap attached to the wing by the actuator system.

4. The assembly of claim 1, further comprising a motor operably coupled to the drive shaft to drive rotation of the drive shaft.

5. The assembly of claim 4, further comprising an actuator controller operably coupled to the motor to control operation of the motor.

6. The assembly of claim 1, wherein each of the first rotary actuator element and the second rotary actuator element are compound gear rotary actuators.

7. The assembly of claim 1, wherein the second rotary actuator element comprises a linkage extension, the actuator system further comprising:
    a spar link pivotably connected to the linkage extension by a first pivot pin; and
    the spar link is connected to the spar by a second pivot pin.

8. The assembly of claim 1, wherein the spar includes a pin, wherein the drive shaft is moveable from a first position to a second position by operation of the first and second rotary actuator elements.

9. The assembly of claim 8, wherein:
    in the first position the drive shaft is separated from the pin of the spar by a first vertical distance and a first horizontal distance,
    in the second position the drive shaft is separated from the pin of the spar by a second vertical distance and a second horizontal distance, and
    the first vertical distance is less than the second vertical distance and the first horizontal distance is greater than the second horizontal distance.

10. The assembly of claim 8, wherein in the second position an air gap is formed between the first structure and the second structure.

11. An aircraft comprising:
    a wing having a trailing edge with a cross-sectional thickness at the trailing edge being 5 inches or less;
    an aircraft flight control element attached to the wing; and
    an actuator system arranged between the wing and the aircraft flight control element and configured to control relative movement of the aircraft flight control element relative to the wing, wherein the actuator system comprises:
        a drive shaft;
        a first rotary actuator element operably coupled to the drive shaft and configured to be driven in a first direction about the drive shaft;
        a second rotary actuator element positioned adjacent the first rotary actuator element and operably coupled to the drive shaft and configured to be driven in a second direction about the drive shaft, the second direction being a counter-rotation relative to the first direction;
        a spar fixedly connected to the wing; and
        a spar connection configured to pivotably connect the first rotary actuator element to the spar at a fixed coupler;
        wherein the drive shaft, the first rotary actuator element, and the second rotary actuator element are housed within the aircraft flight control element, and
        wherein rotation of the second rotary actuator element causes a translation motion of the drive shaft away from the wing and rotation of the first rotary actuator element about the fixed coupler such that the aircraft flight control element is translated and rotated relative to the wing.

12. The aircraft of claim 11, wherein the actuator system comprises at least one additional first rotary actuator element and at least one additional second rotary actuator element coupled to the drive shaft and configured to control movement of the aircraft flight control element, wherein the at least one additional first and second rotary actuator elements are housed within the aircraft flight control element.

13. The aircraft of claim 11, wherein the aircraft flight control element is a flap attached to the wing by the actuator system.

14. The aircraft of claim 11, further comprising a motor operably coupled to the drive shaft to drive rotation of the drive shaft.

15. The aircraft of claim 14, further comprising an actuator controller operably coupled to the motor to control operation of the motor.

16. The aircraft of claim 11, wherein each of the first rotary actuator element and the second rotary actuator element are compound gear rotary actuators.

17. The aircraft of claim 11, wherein the second rotary actuator element comprises a linkage extension, the actuator system further comprising:
   a spar link pivotably connected to the linkage extension by a first pivot pin; and
   the spar link is connected to the spar by a second pivot pin.

18. The aircraft of claim 11, wherein the spar includes a pin, wherein the drive shaft is moveable from a first position to a second position by operation of the first and second rotary actuator elements.

19. The aircraft of claim 18, wherein:
   in the first position the drive shaft is separated from the pin of the spar by a first vertical distance and a first horizontal distance,
   in the second position the drive shaft is separated from the pin of the spar by a second vertical distance and a second horizontal distance, and
   the first vertical distance is less than the second vertical distance and the first horizontal distance is greater than the second horizontal distance.

20. The aircraft of claim 18, wherein in the second position an air gap is formed between the wing and the aircraft flight control element.

* * * * *